(12) United States Patent
Daniel et al.

(10) Patent No.: US 11,092,341 B2
(45) Date of Patent: Aug. 17, 2021

(54) GAS TURBINE FUEL INJECTORS AND PROCESSES

(71) Applicant: GENERAL ELECTRIC COMPANY, Schenectady, NY (US)

(72) Inventors: Benjamin Lamar Daniel, Greer, SC (US); Kassy Moy Hart, Greenvile, SC (US); David William Cihlar, Greenville, SC (US); Steven Charles Woods, Easley, SC (US); Jonathan Glenn Reed, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 608 days.

(21) Appl. No.: 15/407,820

(22) Filed: Jan. 17, 2017

(65) Prior Publication Data

US 2018/0202663 A1     Jul. 19, 2018

(51) Int. Cl.
*F23R 3/34*     (2006.01)
*F23R 3/28*     (2006.01)
*F02C 7/22*     (2006.01)

(52) U.S. Cl.
CPC .............. *F23R 3/346* (2013.01); *F02C 7/222* (2013.01); *F23R 3/283* (2013.01); *F23R 2900/00018* (2013.01)

(58) Field of Classification Search
CPC .. F23R 3/34; F23R 3/346; F23R 3/283; F23R 3/60; F23R 2900/00018; F02C 7/222
See application file for complete search history.

(56) References Cited

U.S. PATENT DOCUMENTS

| | | | | |
|---|---|---|---|---|
| 4,441,323 A | * | 4/1984 | Colley | F23R 3/283 60/737 |
| 9,010,120 B2 | * | 4/2015 | DiCintio | F23R 3/346 60/746 |
| 2011/0056206 A1 | * | 3/2011 | Wiebe | F23D 11/36 60/740 |
| 2012/0110975 A1 | * | 5/2012 | Alholm | F02P 13/00 60/39.827 |
| 2015/0000283 A1 | * | 1/2015 | Ramier | F23R 3/283 60/740 |

* cited by examiner

*Primary Examiner* — Todd E Manahan
*Assistant Examiner* — Thuyhang N Nguyen
(74) *Attorney, Agent, or Firm* — McNees Wallace & Nurick LLC

(57) ABSTRACT

A process includes manufacturing a gas turbine fuel injector body having a stub flange extending radially outward about a circumference of the gas turbine fuel injector body. The stub flange is sized to engage a stepped ledge along a central opening of a mounting flange. The central opening is sized to receive the gas turbine fuel injector body. A gas turbine fuel injector includes a gas turbine fuel injector body and a mounting flange. A method of mounting a gas turbine fuel injector includes placing a stub flange of a gas turbine fuel injector body between a surface of an injector boss and a stepped ledge of a mounting flange. The method also includes securing the gas turbine fuel injector to the injector boss with a plurality of bolts, each bolt extending through a mounting hole in the mounting flange and into a threaded hole in the injector boss.

19 Claims, 7 Drawing Sheets

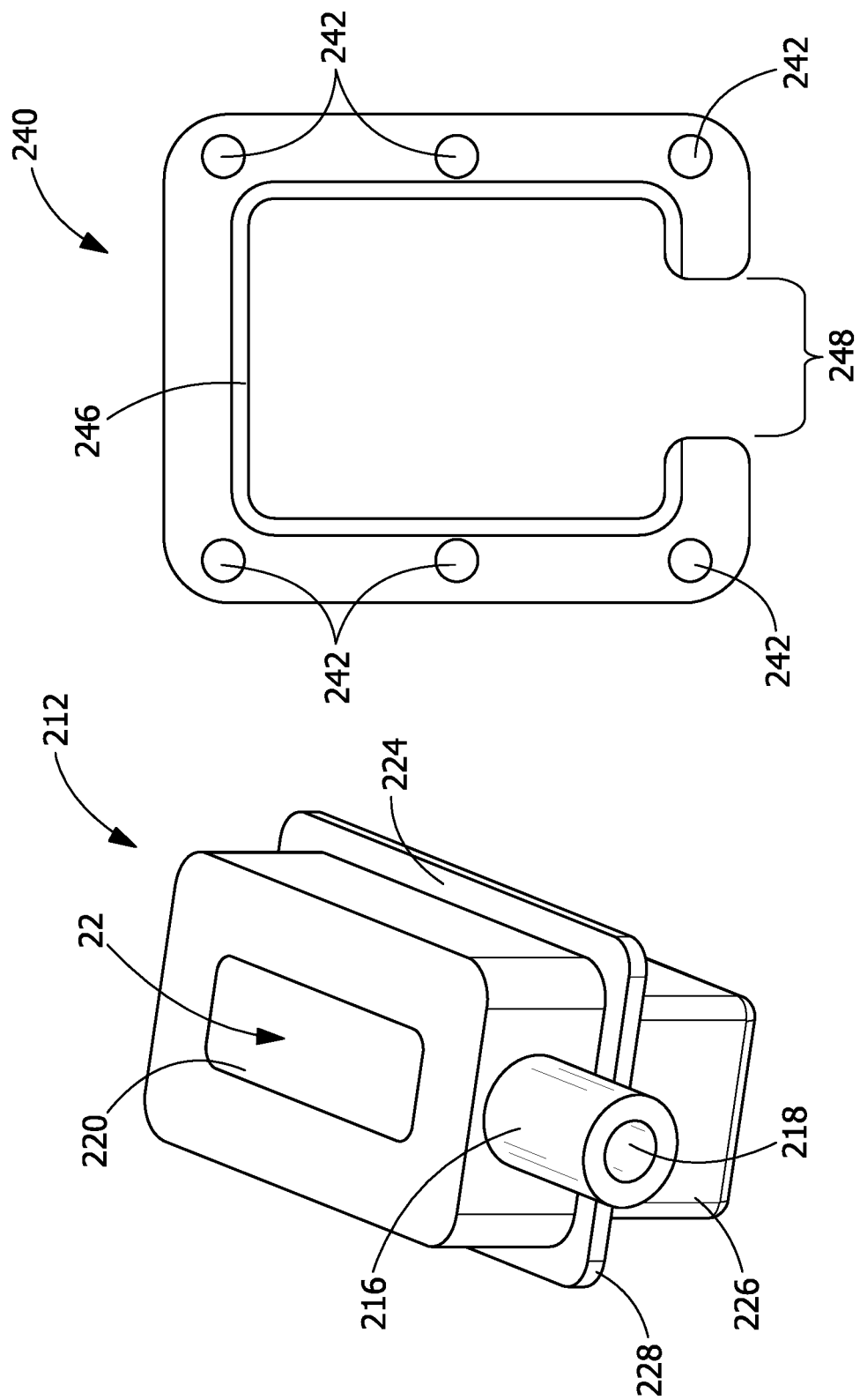

US 11,092,341 B2

GAS TURBINE FUEL INJECTORS AND PROCESSES

TECHNICAL FIELD

The present embodiments are directed to fuel injectors for a gas turbine combustion system. More specifically, the present embodiments are directed to two-piece fuel injectors with an injector body and a flange formed separately from the injector body, where the injector body may be produced by additive manufacturing or casting.

BACKGROUND

In a gas turbine with axial fuel staging (AFS), fuel and air are introduced into two axially separated combustion zones. A portion of the fuel is injected from fuel nozzles at a forward (or head) end of the combustor into a primary combustion zone of the gas turbine. Additional fuel, conventionally premixed with air, is injected from fuel injectors into a secondary combustion zone downstream of the primary combustion zone, which operates at a low equivalence ratio to minimize the formation of $NO_x$ and particulates.

Fuel injection into the secondary combustion zone is accomplished by multiple AFS injectors. An AFS injector may be conventionally formed as a single piece including a cylindrical injector body and a flange extending from the body.

Additive manufacturing processes form a three-dimensional object by forming successive layers of material, typically under computer control. Three-dimensional (3D) printing is an additive manufacturing technique enabling creation of an article by forming successive layers of material under computer control to create a 3D structure. The process typically includes heating a layer of powder of the material to melt or sinter the powder to the previously-placed layers to form the article layer by layer. Plastic, ceramic, glass, and metal articles may be formed by 3D printing from powders of plastic, ceramic, glass, and metal, respectively. A 3D printer lays down powder material, and a focused energy source melts or sinters that powder material in certain predetermined locations based on a model from a computer-aided design (CAD) file.

Additive manufacturing methods include direct metal laser melting (DMLM), direct metal laser sintering (DMLS), selective laser melting (SLM), selective laser sintering (SLS), and electron beam melting (EBM). Once one layer is melted or sintered and formed, the 3D printer repeats the process by placing and melting or sintering additional layers of material on top of the first layer or where otherwise instructed, one layer at a time, until the entire article is fabricated. 3D printing may be accomplished by powder bed processing or other methods of powder processing.

BRIEF DESCRIPTION

In an exemplary embodiment, a process includes manufacturing at least one gas turbine fuel injector body having a stub flange extending radially outward about a circumference of the gas turbine fuel injector body. The stub flange is sized to engage a stepped ledge along a central opening of a mounting flange.

In another exemplary embodiment, a gas turbine fuel injector includes a gas turbine fuel injector body having a stub flange extending radially outward about a circumference of the gas turbine fuel injector body and a mounting flange having a central opening sized to receive the gas turbine fuel injector body. The mounting flange includes a stepped ledge along the central opening sized to engage the stub flange.

In another exemplary embodiment, a method of mounting a gas turbine fuel injector includes placing a stub flange of a gas turbine fuel injector body of the gas turbine fuel injector between a surface of an injector boss and a stepped ledge of a mounting flange of the gas turbine fuel injector. The method also includes securing the gas turbine fuel injector to the injector boss with a plurality of bolts, each bolt extending through a mounting hole in the mounting flange and into a threaded hole in the injector boss.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 8 is a schematic elevated perspective view of an alternate gas turbine fuel injector body for use with the combustor of FIG. 1, according to another aspect of the present disclosure.

FIG. 9 is a top schematic view of an alternate mounting flange of the gas turbine fuel injector of FIG. 8.

Wherever possible, the same reference numbers will be used throughout the drawings to represent the same parts.

DETAILED DESCRIPTION

Provided are two-piece fuel injectors with a fuel injector body having a stub flange and a separate mounting flange configured to engage the stub flange. The fuel injector body may be formed by additive manufacturing (e.g., by three-dimensional metal laser printing) or by casting. The mounting flange may be formed by the same process at a different time, or by a different process.

Embodiments of the present disclosure, for example, in comparison to concepts failing to include one or more of the features disclosed herein, significantly reduce the cost of forming a gas turbine fuel injector, the complexity of forming a gas turbine fuel injector, the time for forming a gas turbine fuel injector, the cost of forming an axial fuel staging (AFS) injector, the complexity of forming an AFS injector, the time for forming an AFS injector, or combinations thereof.

When using additive manufacturing, a two-piece gas turbine fuel injector not only reduces the size but also the printing complexity. The additive manufacturing of gas turbine fuel injectors, as disclosed herein, is advantageous for quick-to-market applications. In contrast, a large injector size, including a large, integral, unsupported mounting flange, increases build time, development time, and cost. When forming by casting, a two-piece gas turbine fuel injector similarly reduces the size, the materials cost, and the complexity for casting.

Because the mounting flanges are produced separately, more gas turbine fuel injector bodies without mounting flanges may be simultaneously printed on a single additive manufacturing tray, as disclosed herein. This decreases build time and increases part throughput, thereby decreasing cost. Less injector mass for additive manufacturing decreases build time and cost. Machining the mounting flange out of an alternate material, rather than forming it by additive manufacturing, also reduces cost. In some embodiments, the two-piece gas turbine fuel injector, as disclosed herein, includes one or more modifications to the injector and/or the boss, which may include, but are not limited to, modifications to the overall fuel injector shape, modifications to the internal flow shapes, modifications to the swirling features, or combinations thereof.

Figure 1:
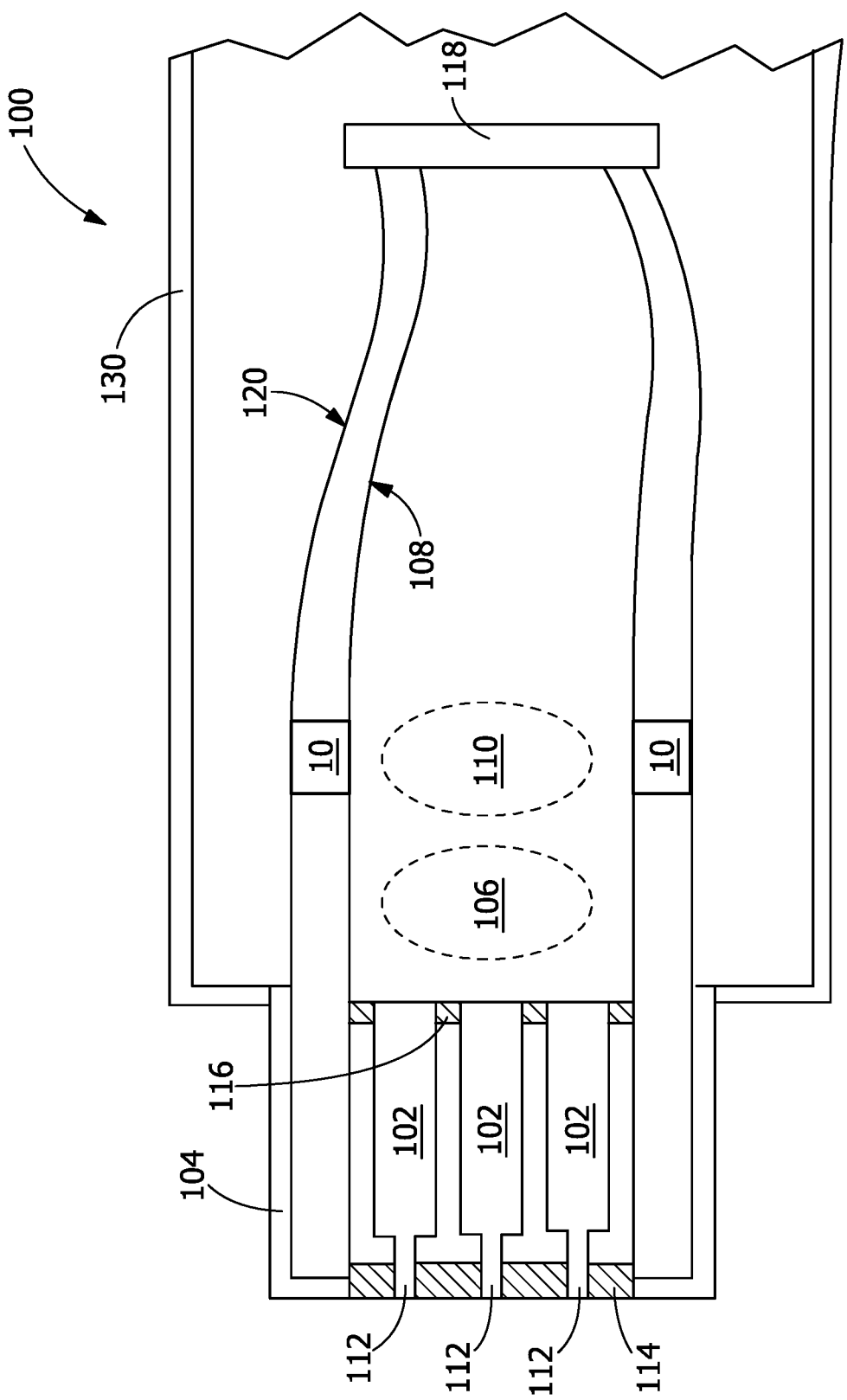
FIG. 1 is a schematic cross-sectional view of a combustor of a gas turbine in an embodiment of the present disclosure.

Referring to FIG. 1, a combustor 100 for a gas turbine includes fuel nozzles 102 in a forward casing 104 supplying fuel for combustion in a primary combustion zone 106. Gas turbine fuel injectors 10 mounted to the liner 108 of the combustor 100 supply additional fuel and air to a secondary combustion zone 110 downstream of the primary combustion zone 106. In some embodiments, the gas turbine fuel injectors 10 are axial fuel staging injectors that direct a fuel/air mixture through an opening in the liner 108 in a generally radial direction, relative to the longitudinal axis of the combustor 100. The forward casing 104 also includes an end cover 114 at the inlet end of the fuel nozzles 102, and a cap 116 at the outlet end of the fuel nozzles 102. Fuel inlets 112 to the fuel nozzles 102 extend through the end cover 114.

Combustion occurs within a volume defined by the liner 108, between the cap 116 and an aft frame 118 at the aft end of the combustor 100. In the case of axially-staged combustion, combustion occurs in both the primary combustion zone 106 and the secondary combustion zone 110. The liner 108 may be of a unibody construction of a single piece from the cap 116 to the aft frame 118 or may be formed of a liner and a separate transition piece. An outer sleeve 120 surrounds an outer surface of the liner 108 on the side opposite of the combustion zone side. In some embodiments, at least the combustion portion of the combustor 100 is housed within a compressor discharge casing 130.

Figure 3:
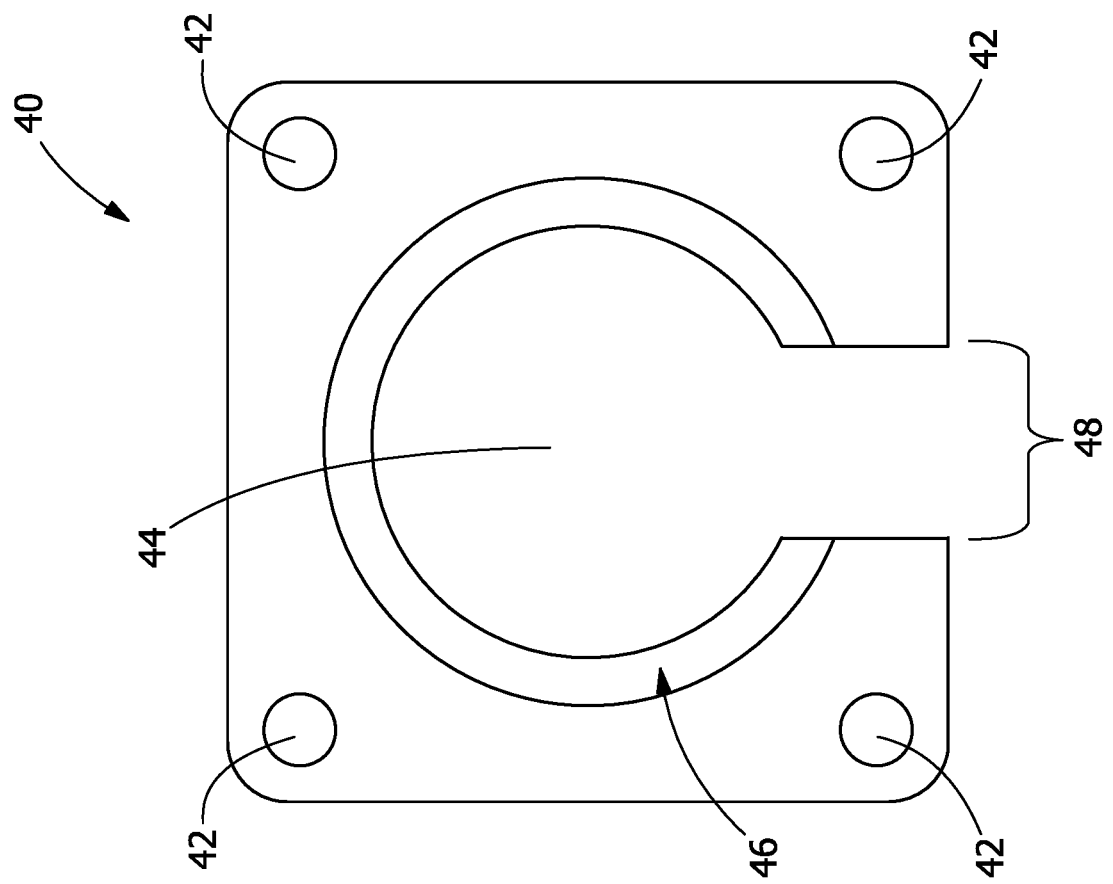
FIG. 3 is a top schematic view of a mounting flange of one of the gas turbine fuel injectors of the combustor of FIG. 1.
Figure 2:
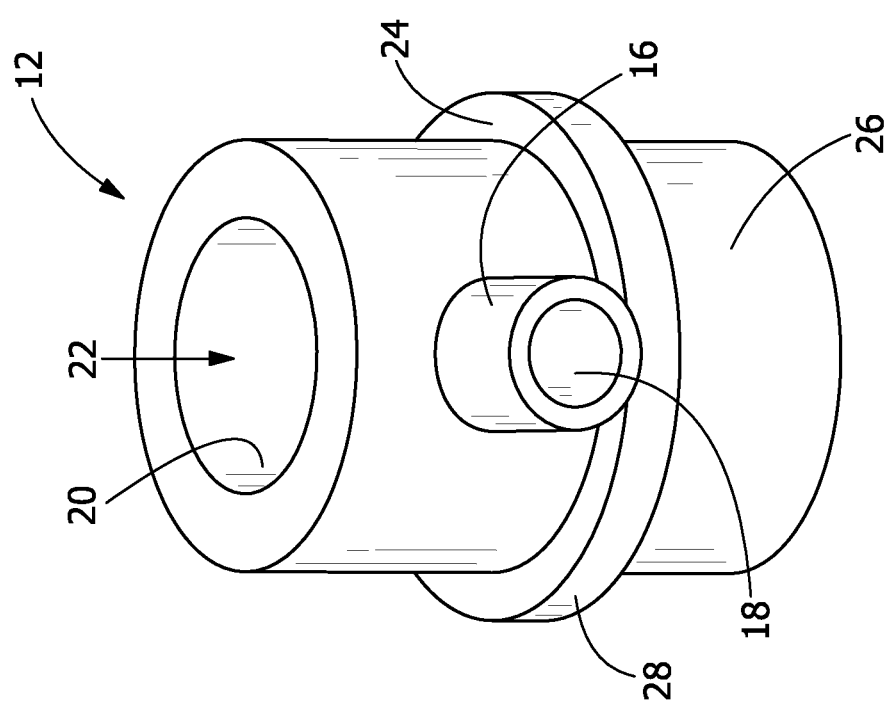
FIG. 2 is a schematic elevated perspective view of a gas turbine fuel injector body of one of the gas turbine fuel injectors of the combustor of FIG. 1.

Referring to FIG. 2 and FIG. 3, a gas turbine fuel injector 10 includes a gas turbine fuel injector body 12 and a mounting flange 40. In some embodiments, the gas turbine fuel injector 10 is an AFS injector. The gas turbine fuel injector body 12 is shown as generally having a cylindrical shape in FIG. 2 but may alternatively have a non-cylindrical or a non-round shape, such as the oblong shape shown in FIG. 8. The gas turbine fuel injector body 12 includes a fuel inlet 16 with a fuel inlet hole 18 supplying fuel to the gas turbine fuel injector 10, an injector throat 20 receiving air 22 to mix with the fuel, and a nozzle 26 directing the mixed stream of air and fuel from the gas turbine fuel injector 10. A stub flange 28 with a stepped shelf 24 extends radially around the central portion of the gas turbine fuel injector body 12. Referring to FIG. 3, the mounting flange 40 includes mounting holes 42, a central opening 44 sized to receive the gas turbine fuel injector body 12, and a radial opening 48 in which the fuel inlet 16 is received. A stepped ledge 46 lines the central opening 44 and is sized and contoured to engage the stepped shelf 24 of the stub flange 28 of the gas turbine fuel injector body 12.

Figure 4:
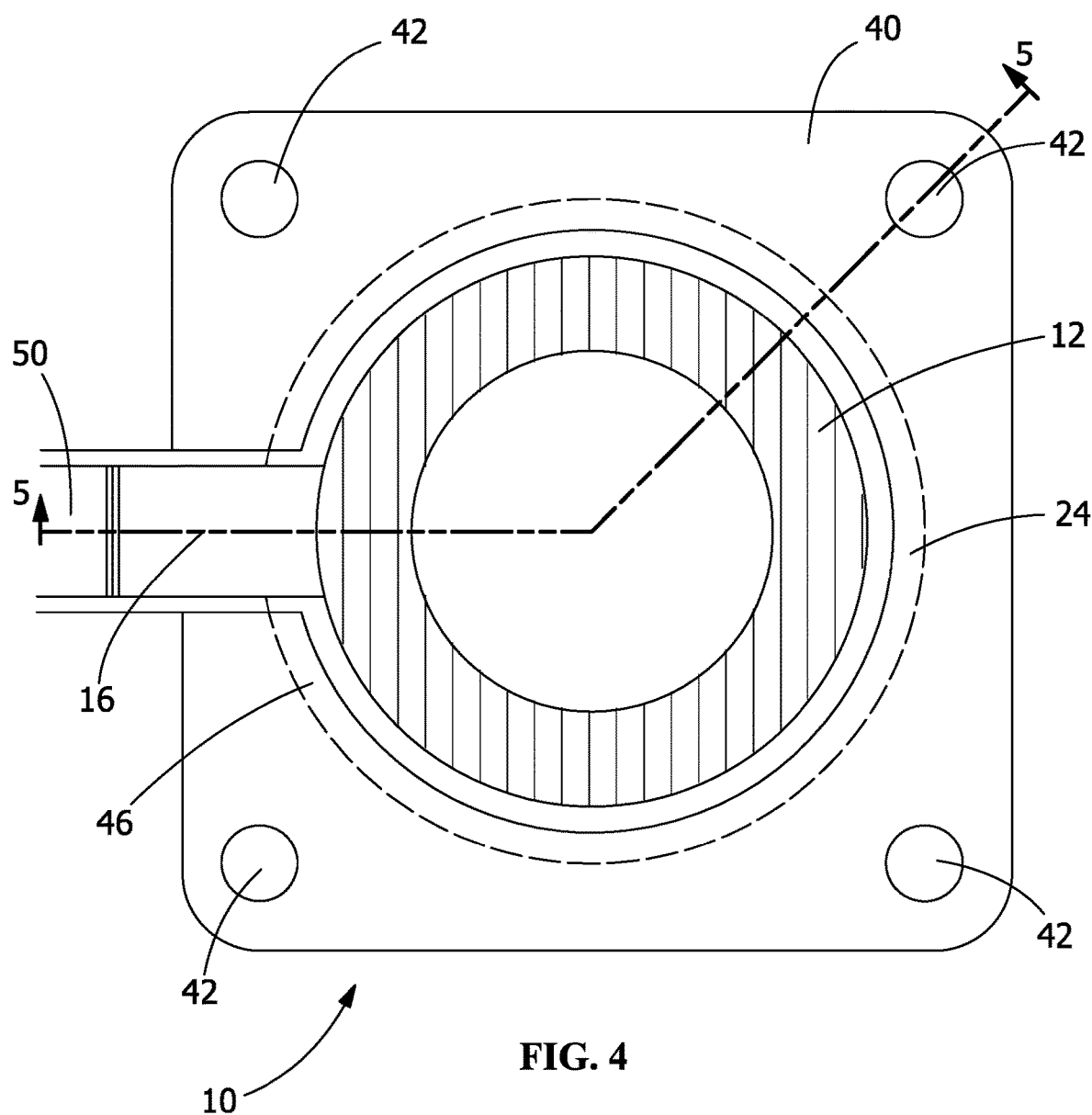
FIG. 4 is a top schematic view of the gas turbine fuel injector formed from the gas turbine fuel injector body of FIG. 2 and the mounting flange of FIG. 3.

As best seen in FIG. 4, the mounting flange 40 makes up a significant portion of the footprint of the gas turbine fuel injector 10. A maximum dimension of a footprint of the gas turbine fuel injector 10 is significantly greater than a maximum dimension of a footprint of the gas turbine fuel injector body 12. The assembled gas turbine fuel injector 10 is shown in FIG. 4 with a fuel supply line 50 coupled to the fuel inlet 16 of the gas turbine fuel injector body 12.

Figure 5:
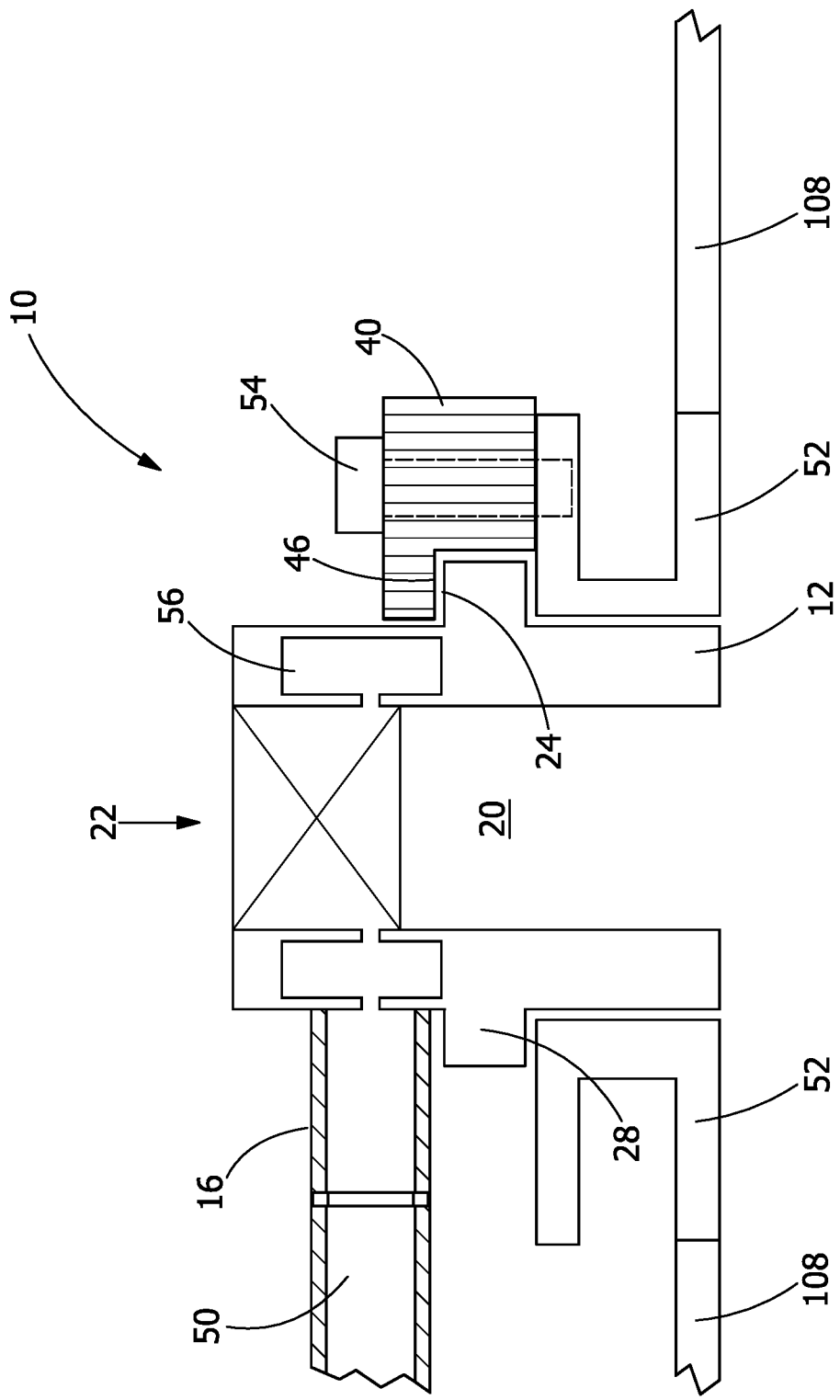
FIG. 5 is a schematic cross-sectional view of the gas turbine fuel injector of FIG. 4 taken along line 5-5 in the combustor of FIG. 1.

Referring to FIG. 5, a gas turbine fuel injector 10 is mounted in an opening in the liner 108 of the combustor 100 by locating the stub flange 28 of the gas turbine fuel injector body 12 over a surface of an injector boss 52 lining the circumference of an opening in the liner 108. The mounting flange 40 is positioned over the fuel injector body 12, such that the stepped ledge 46 of the mounting flange 40 is located above the stepped shelf 24 of the stub flange 28. Bolts 54 extending through the mounting holes 42 in the mounting flange 40 and into threaded holes in the injector boss 52 secure the mounting flange 40 to the injector boss 52, thereby securing the stub flange 28 between the injector boss 52 and the mounting flange 40.

A fuel plenum 56 is also shown in FIG. 5 for directing the incoming fuel into the injector throat 20 of the gas turbine fuel injector body 12 for mixing with the incoming air 22. Although not shown in FIG. 5, the gas turbine fuel injector body 12 may include additional internal structures to direct air and fuel flow for mixing within the gas turbine fuel injector body 12, such as swirler vanes mounted on a spindle within the injector throat 20 that promote mixing of the air stream with the fuel stream.

Figure 6:
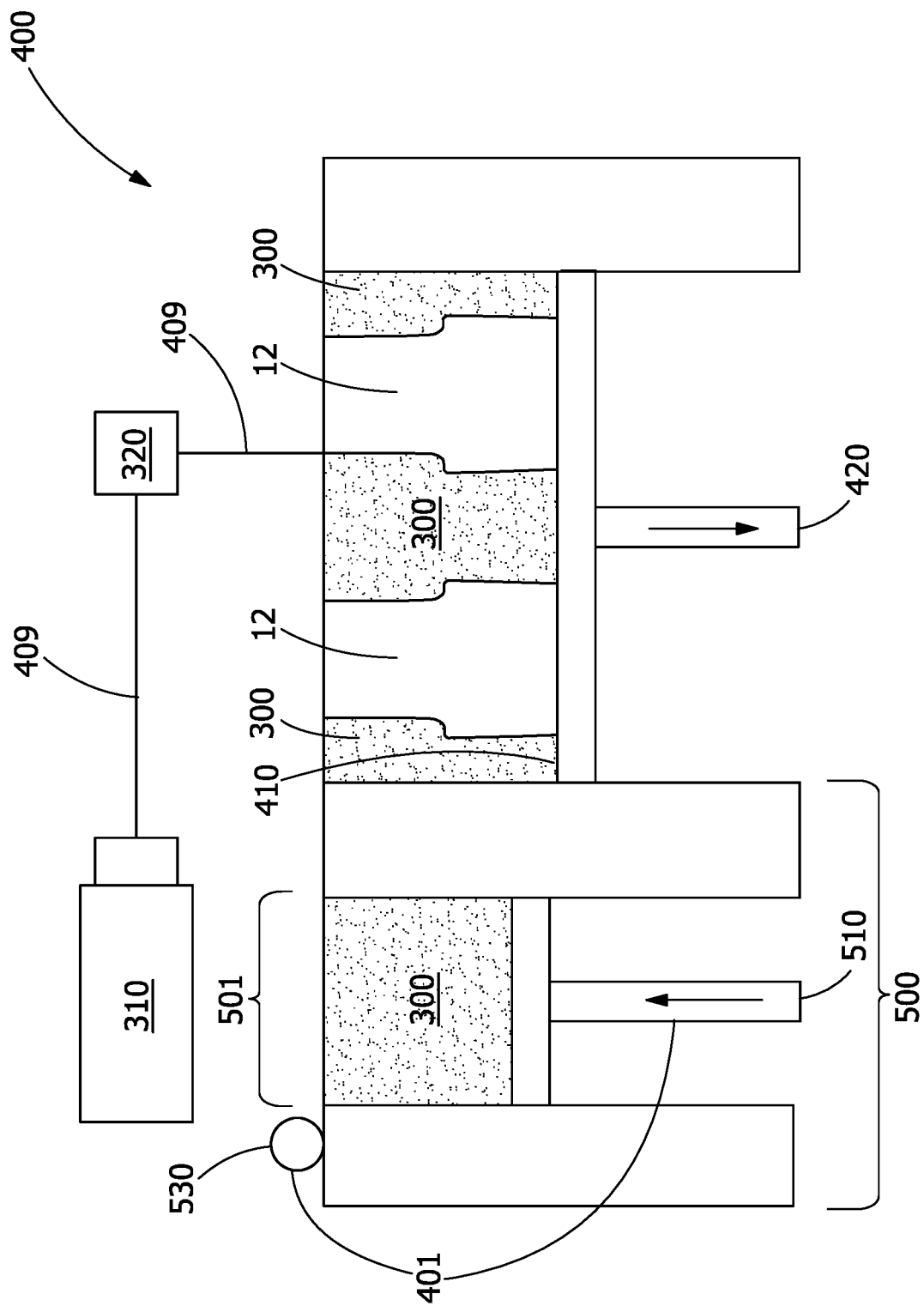
FIG. 6 is a schematic view of an additive manufacturing system including a powder bed in an embodiment of the present disclosure.

Referring to FIG. 6, the additive manufacturing process may be performed with an additive manufacturing system 400 having a powder bed. The powder deposition assembly 500 includes a hopper 501, a powder delivery assembly 401, and a focused energy source 310. The hopper 501 is a walled chamber flanking the additive manufacturing tray 410. The powder delivery assembly 401 includes a piston 510 supplying a powder material 300 from the hopper 501, and a spreader 530 spreading the powder material 300 that extends above the top surface of the hopper 501 across the top of the powder bed as a new layer to be selectively sintered or melted. The spreader 530 may be any apparatus capable of moving powder material 300 from above the hopper 501 to above the additive manufacturing tray 410. In some embodiments, the spreader 530 is a roller. In some embodiments, the spreader 530 is a blade.

The additive manufacturing process includes a focused energy source 310 to fuse powder metal by sintering or melting to form the gas turbine fuel injector bodies 12. In some embodiments, the focused energy source 310 is a high power laser. In some embodiments, the high power laser is a carbon dioxide laser. In some embodiments, the focused energy beam 409 is a pulsed beam. The focused energy beam 409 is directed by a scanner 320 to selectively fuse powder material 300 by scanning cross-sections generated from a 3D digital description, such as a CAD file or scan data, of the gas turbine fuel injector bodies 12 on the surface of a powder bed on an additive manufacturing tray 410. Before each cross-section is scanned, the powder bed is lowered by one layer thickness by actuating a fabrication piston 420 to lower the additive manufacturing tray 410, a hopper piston 510 is actuated to raise the material in the hopper 501 by the equivalent of the one layer thickness of the powder bed, a new layer of powder material 300 is applied on top of the powder bed by the spreader 530, and the process is repeated until the gas turbine fuel injector bodies 12 are completed. The gas turbine fuel injector bodies 12 being constructed are surrounded by un-sintered powder material 300 at all times, which allows for the construction of previously impossible geometries.

Multiple gas turbine fuel injector bodies 12 may be formed at the same time by additive manufacturing on the additive manufacturing tray 410. Since the gas turbine fuel injector bodies 12 are formed without a mounting flange 40, they have a smaller footprint, which may allow several gas turbine fuel injector bodies 12 to be additively manufactured on the additive manufacturing tray 410, whereas only one gas turbine fuel injector 10 with a gas fuel injector body 12 of the same size with an integral mounting flange 40 of the same size would be able to be additively manufactured on the additive manufacturing tray 410 of the same dimensions.

Figure 7:
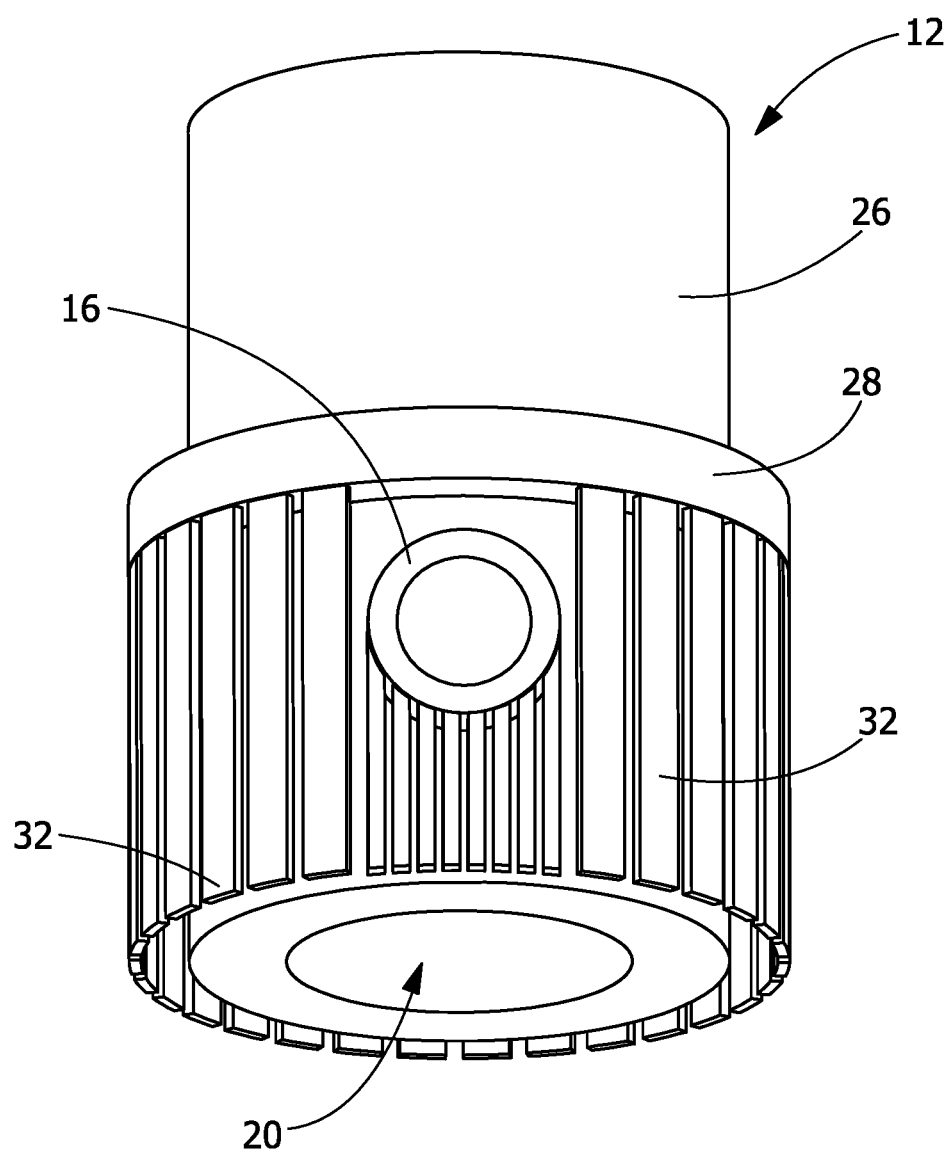
FIG. 7 is a schematic elevated perspective view of a gas turbine fuel injector body with printing supports after formation by additive manufacturing.

The gas turbine fuel injector body 12, when formed by additive manufacturing, may include supports 32, for example, the printing supports shown in FIG. 7. The printing supports may be perforated for easy removal or may be removed by machining prior to use.

In some embodiments, supports 32 may be used for other features of the gas turbine fuel injector body 12, for example, swirler vanes in the injector throat 20.

In addition to any machining done after the additive manufacture, surface treatments may be used to smooth surfaces of the gas turbine fuel injector body 12. In some embodiments, the surface treatment includes, but may not be limited to, polishing, grit blasting, or a combination thereof.

In some embodiments, the additive manufacturing provides a gas turbine fuel injector body 12 having a net shape or a near-net shape. In some embodiments, the additive manufacturing provides a gas turbine fuel injector body 12 having a net or a near-net shape, except for any machining related to removal of the supports 32. As used herein, the phrase "near-net" refers to being of a geometry and size requiring little or no machining and processing after additive manufacturing. As used herein, the phrase "net" refers to being of a geometry and size requiring no machining and processing after additive manufacturing.

In some embodiments, a gas turbine fuel injector body 12 is formed by an additive manufacturing technique without the large extended mounting flange 40. The mounting flange 40 may be formed separately by any metal forming process. In some embodiments, the mounting flange 40 is formed by traditional processing, which may include, but is not limited to, forging, casting, machining, or combinations thereof. The mounting flange 40 secures, or otherwise attaches, the gas turbine fuel injector body 12 to the injector boss 52 in the injector assembly. Forming the gas turbine fuel injector body 12 without this mounting flange 40 allows more and/or larger gas turbine fuel injector bodies 12 to be additively manufactured in a single run on a given additive manufacturing tray 410 at an increased rate and a decreased cost compared to manufacture of a one-piece gas turbine fuel injector 10 with currently-available additive manufacturing systems 400.

Any additive manufacturing process may be used, including, but not limited to, direct metal laser melting (DMLM), direct metal laser sintering (DMLS), selective laser melting (SLM), selective laser sintering (SLS), electron beam melting (EBM), laser cladding, and powder bed fusion.

In some embodiments, the additive manufacturing technique includes a DMLM process. The DMLM process may be performed with a powder deposition assembly 500 of an additive manufacturing system 400, which includes a powder delivery assembly 401 and a focused energy source 310. The powder delivery assembly 401 includes a nozzle and one or more material feeders. During the DMLM process, the one or more material feeders deliver the powder material 300 and/or any other material to the nozzle, which direct the powder material 300 toward an additive manufacturing tray 410. The focused energy source 310 concurrently directs a focused energy beam 409 through the nozzle, forming a gas atomized powder material exiting the nozzle. Next, the DMLM process includes directing the gas atomized powder material towards the additive manufacturing tray 410, and depositing the gas atomized powder material on the additive manufacturing tray 410.

During the directing of the powder material 300 and the focused energy beam 409, the DMLM process includes moving at least one of the nozzle and the additive manufacturing tray 410 relative to each other, the moving corresponding to the geometry of the gas turbine fuel injector bodies 12. To provide relative movement, the additive manufacturing tray 410 may be fixed and the powder deposition assembly 500 may be moved, the powder deposition assembly 500 may be fixed and the additive manufacturing tray 410 may be moved, or both the powder deposition assembly 500 and the additive manufacturing tray 410 may be moved independently of each other. For example, in one embodiment, the additive manufacturing tray 410 includes three or more axes of rotation for moving relative to the powder deposition assembly 500.

In some embodiments, movement of the additive manufacturing tray 410 and/or the powder deposition assembly 500 of the additive manufacturing system 400 is controlled by software configured to automate the process and/or form the gas turbine fuel injector bodies 12 based upon a computer-aided design (CAD) model. In some embodiments, the DMLM process is an automated 3D printing process.

The relative movement of the additive manufacturing tray 410 and/or the powder deposition assembly 500 during the DMLM process may provide a dimensional accuracy of at least 0.001 inches, at least 0.005 inches, at least 0.01 inches, between 0.001 and 0.01 inches, between 0.001 and 0.005 inches, or any combination, sub-combination, range, or sub-range thereof. Additionally, the DMLM process provides a fully dense metal in the gas turbine fuel injector bodies 12 formed therefrom. Furthermore, the DMLM process may provide heterogeneous material fabrication, homogeneous material fabrication, control over external geometry, control over internal geometry, or a combination thereof.

The one or more material feeders and/or the nozzle may be configured to provide any suitable composition of the atomized powder material. Suitable compositions may include, but are not limited to, similar or substantially similar compositions between layers, differing compositions between layers, gradient compositions within the gas turbine fuel injector body 12, or a combination thereof. For example, gradient compositions within the gas turbine fuel injector bodies 12 may be formed by varying flow rate and/or compositions between material feeders, varying compositions within the material feeders, or a combination thereof. In one embodiment, the flow rate for the powder material 300 includes, for example, up to 5 g/min, between 0.1 and 5 g/min, between 0.5 and 4.5 g/min, or any combination, sub-combination, range, or sub-range thereof. In another embodiment, the directing of the focused energy beam 409 and the powder material 300 is shielded by a shielding gas, such as argon. Suitable shielding gas flow rates, include, but are not limited to, between 1 and 15 l/min, between 2 and 10 l/min, or any combination, sub-combination, range, or sub-range thereof.

Suitable focused energy sources 310 for the DMLM process include any focused energy source 310 operating in a power range and travel speed for depositing the atomized powder material. In some embodiments, the focused energy source 310 is a laser. In one embodiment, the power range of the focused energy source 310 in the DMLM process includes, but is not limited to, between 100 and 3,000 watts, between 200 and 2,500 watts, between 300 and 2,000 watts, or any combination, sub-combination, range, or sub-range thereof. In another embodiment, the travel speed includes, but is not limited to, up to 300 mm/sec, between 1 and 300 mm/sec, between 4 and 250 mm/sec, or any combination, sub-combination, range, or sub-range thereof. For example, in a further embodiment, the focused energy source 310 operates in the power range of between 300 and 2,000 watts, at a travel speed of between 4 and 250 mm/sec. In another embodiment, a deposition rate for standard steels, titanium, and/or nickel alloys includes, for example, up to 1 kg/hour, up to 0.75 kg/hour, up to 0.5 kg/hour, between 0.1 and 0.5 kg/hour, up to 0.4 kg/hour, up to 0.3 kg/hour, or any combination, sub-combination, range, or sub-range thereof.

In some embodiments, the additive manufacturing technique includes a DMLS process. In a DMLS process, a focused energy source 310 is fired into a bed of powdered metal. In some embodiments, the focused energy source 310 is a ytterbium (Yb)-fiber laser, or more specifically a high-power 200-watt Yb-fiber optic laser. The laser is automatically fired at points in space defined by a 3D CAD model to heat the powdered metal and sinter it to already formed layers of the gas turbine fuel injector bodies 12. In some embodiments, computer software on a computer directs the laser. Inside a build chamber area, a material dispensing platform dispenses the powdered metal to a build platform, and a recoater blade moves new powder over the build platform. The modification is built up additively, layer by layer. In some embodiments, the layers are about 20 micrometers thick.

In some embodiments, the additive manufacturing technique includes an SLM process. SLM also includes 3D CAD data as a digital information source and a focused energy source 310. In some embodiments, the focused energy source 310 is a high-power (hundreds of watts) laser beam, and more specifically a Yb-fiber laser. The laser beam melts a fine powdered metal to build the gas turbine fuel injector body 12. The added material is added layer by layer, the layers usually being about 20 to 100 micrometers in thickness. The laser selectively melts thin layers of atomized fine metal powder that are evenly distributed by a coating mechanism onto the gas turbine fuel injector body 12 being built. This occurs in a controlled inert-gas chamber. The inert gas is typically either argon or nitrogen with oxygen levels below 500 parts per million. The laser energy is intense enough to permit full melting of the particles of the added material.

In some embodiments, the gas turbine fuel injector body 12 is additively manufactured from a nickel-based alloy.

In some embodiments, the mounting flange 40 is made of stainless steel. In some embodiments, the mounting flange 40 is made of a nickel-based alloy.

Referring to FIG. 8 and FIG. 9, a gas turbine fuel injector 10 includes a gas turbine fuel injector body 212 and a mounting flange 240. Referring to FIG. 8, the gas turbine fuel injector body 212 is shown as having a generally oblong shape, such as may be formed by attaching a semi-circle to each end of a rectangle, such that the diameter of the semi-circular ends is equal to the width of the rectangle. The gas turbine fuel injector body 212 includes a fuel inlet 216 with a fuel inlet hole 218 supplying fuel to the gas turbine fuel injector 10, an injector throat 220 receiving air 22 to mix with the fuel, and a nozzle 226 directing the mixed stream of air and fuel from the gas turbine fuel injector 10. A stub flange 228 with a stepped shelf 224 extends radially around the central portion of the gas turbine fuel injector body 212. Referring to FIG. 9, the mounting flange 240 includes mounting holes 242, a central opening 244 sized to receive the gas turbine fuel injector body 212, and a radial opening 248 in which the fuel inlet 216 is received. A stepped ledge 246 lines the central opening 244 and is sized and contoured to engage the stepped shelf 224 of the stub flange 228 of the gas turbine fuel injector body 212.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In addition, all numerical values identified in the detailed description shall be interpreted as though the precise and approximate values are both expressly identified.

What is claimed is:

1. A process comprising:
   manufacturing at least one gas turbine fuel injector body having a stub flange extending radially outward about a circumference of the gas turbine fuel injector body, the gas turbine fuel injector body defining a fuel plenum, the stub flange having a stepped shelf;
   wherein the stepped shelf of the stub flange is sized to engage a stepped ledge along a central opening of a mounting flange, the central opening being sized to receive the gas turbine fuel injector body, the mounting flange being securable to an injector boss at an opening in a liner of a combustor such that the stub flange is disposed between the injector boss and the mounting flange, such that contact between the mounting flange and a base of the injector boss and contact between the stepped shelf of the stub flange and the stepped ledge of the mounting flange axially maintains the stub flange, thereby mounting the gas turbine fuel injector body to the liner,
   wherein the gas turbine fuel injector body further comprises a fuel inlet extending radially outward from the gas turbine fuel injector body, and the mounting flange includes a radial opening located such that the fuel inlet sits in the radial opening when the gas turbine fuel injector is mounted to the liner.

2. The process of claim 1, wherein the gas turbine fuel injector body is an axial fuel staging injector body.

3. The process of claim 1, wherein the manufacturing comprises additive manufacturing.

4. The process of claim 3, wherein the additive manufacturing comprises additive manufacturing a plurality of the at least one gas turbine fuel injector body on a single additive manufacturing tray in a single additive manufacturing run.

5. The process of claim 1, wherein the manufacturing comprises direct metal laser melting.

6. The process of claim 1 further comprising manufacturing the mounting flange.

7. A gas turbine fuel injector comprising:
a gas turbine fuel injector body having a stub flange extending radially outward about a circumference of the gas turbine fuel injector body, the gas turbine fuel injector body defining a fuel plenum, the stub flange having, a stepped shelf, and
a mounting flange having a central opening sized to receive the gas turbine fuel injector body and a stepped ledge along the central opening sized and contoured to engage the stepped shelf of the stub flange, the mounting flange being securable to an injector boss at an opening in a liner of a combustor such that the stub flange is disposed between the injector boss and the mounting flange, such that contact between the mounting flange and a base of the injector boss and contact between the stepped shelf of the stub flange and the stepped ledge of the mounting flange axially maintains the stub flange, thereby mounting the gas turbine fuel injector body to the liner,
wherein the gas turbine fuel injector body further comprises a fuel inlet extending radially outward from the gas turbine fuel injector body, and the mounting flange includes a radial opening located such that the fuel inlet sits in the radial opening when the gas turbine fuel injector is mounted to the liner.

8. The gas turbine fuel injector of claim 7, wherein a maximum dimension of a footprint of the gas turbine fuel injector is greater than a maximum dimension of a footprint of the gas turbine fuel injector body.

9. The gas turbine fuel injector of claim 7, wherein the gas turbine fuel injector is an axial fuel staging injector.

10. The gas turbine fuel injector of claim 7, wherein the gas turbine fuel injector body is formed by additive manufacturing.

11. The gas turbine fuel injector of claim 7, wherein the gas turbine fuel injector body is formed by casting.

12. The gas turbine fuel injector of claim 7, wherein the gas turbine fuel injector is a two-piece gas turbine fuel injector consisting of the gas turbine fuel injector body and the mounting flange.

13. The gas turbine fuel injector of claim 7, wherein the stub flange is located radially inward of the fuel plenum when the gas turbine fuel injector is mounted to the liner.

14. The gas turbine fuel injector of claim 7, wherein the fuel plenum is located off a central axis of the gas turbine fuel injector body and in a wall of the gas turbine fuel injector body.

15. A method of mounting a gas turbine fuel injector comprising:
placing a stepped shelf of a stub flange of a gas turbine fuel injector body of the gas turbine fuel injector between a surface of an injector boss and a stepped ledge of a mounting flange of the gas turbine fuel injector, the stub flange extending radially outward about a circumference of the gas turbine fuel injector body, the gas turbine fuel injector body defining a fuel plenum; and
securing the gas turbine fuel injector to the injector boss with a plurality of bolts, each bolt extending through a mounting hole in the mounting flange and into a threaded hole in the injector boss such that the stub flange is disposed between the injector boss and the mounting flange, such that contact between the mounting flange and a base of the injector boss and contact between the stepped shelf of the stub flange and the stepped ledge of the mounting flange axially maintains the stub flange, thereby mounting the gas turbine fuel injector body to the liner,
wherein the gas turbine fuel injector body further comprises a fuel inlet extending radially outward from the gas turbine fuel injector body, and the mounting flange includes a radial opening located such that the fuel inlet sits in the radial opening when the gas turbine fuel injector is mounted to the liner.

16. The method of claim 15, wherein the placing further comprises aligning a fuel inlet of the gas turbine fuel injector body with a radial opening in the mounting flange.

17. The method of claim 15, wherein a maximum dimension of a footprint of the gas turbine fuel injector is greater than a maximum dimension of a footprint of the gas turbine fuel injector body.

18. The method of claim 15, wherein the gas turbine fuel injector is an axial fuel staging injector.

19. The method of claim 15, wherein the gas turbine fuel injector body is formed by additive manufacturing.

* * * * *